United States Patent

Misao

(10) Patent No.: US 9,151,594 B2
(45) Date of Patent: Oct. 6, 2015

(54) POSITION DETECTION APPARATUS AND IMAGE FORMING APPARATUS

(75) Inventor: Yoji Misao, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 13/571,768

(22) Filed: Aug. 10, 2012

(65) Prior Publication Data

US 2013/0043415 A1    Feb. 21, 2013

(30) Foreign Application Priority Data

Aug. 19, 2011  (JP) ................. 2011-179664

(51) Int. Cl.
| | |
|---|---|
| B65H 7/14 | (2006.01) |
| G01B 11/02 | (2006.01) |
| G03G 15/23 | (2006.01) |
| G03G 15/00 | (2006.01) |
| B41J 11/00 | (2006.01) |
| B65H 85/00 | (2006.01) |
| B65H 7/10 | (2006.01) |

(52) U.S. Cl.
CPC ............ *G01B 11/028* (2013.01); *B41J 11/0095* (2013.01); *B65H 7/10* (2013.01); *B65H 7/14* (2013.01); *B65H 85/00* (2013.01); *G03G 15/234* (2013.01); *G03G 15/6567* (2013.01); *B65H 2220/01* (2013.01); *B65H 2301/33312* (2013.01); *B65H 2511/12* (2013.01); *B65H 2511/20* (2013.01); *B65H 2511/222* (2013.01); *B65H 2511/51* (2013.01); *B65H 2553/412* (2013.01); *B65H 2553/416* (2013.01); *B65H 2553/81* (2013.01); *B65H 2553/822* (2013.01); *B65H 2555/26* (2013.01); *B65H 2557/2423* (2013.01); *B65H 2701/1315* (2013.01)

(58) Field of Classification Search
CPC .......... B65H 16/00; B65H 1/00; B65H 29/00; B65H 45/00; B65H 2553/822; B65H 2701/1315; B65H 2701/1313; B65H 2701/131; B65H 7/14; B65H 9/002
USPC ............... 250/559.29, 559.3, 559.33, 559.36, 250/548, 221, 206.1; 356/399–402; 358/449, 486, 488, 496
See application file for complete search history.

(56) References Cited

U.S. PATENT DOCUMENTS

| | | | |
|---|---|---|---|
| 5,973,797 | A | 10/1999 | Tanaka et al. |
| 7,209,702 | B2 | 4/2007 | Kohchi et al. |

(Continued)

FOREIGN PATENT DOCUMENTS

| | | |
|---|---|---|
| CN | 1619430 A | 5/2005 |
| EP | 1533660 A2 | 5/2005 |

(Continued)

*Primary Examiner* — Francis M Legasse, Jr
*Assistant Examiner* — Don Williams
(74) *Attorney, Agent, or Firm* — Fitzpatrick, Cella, Harper & Scinto

(57) ABSTRACT

A position detection apparatus comprises a sensor unit 80 and a moving holder 81 and a holder drive portion 82. The sensor unit has a plurality of pairs of sensors, each of which includes a light emitting portion held on the first holding surface 81*a* and a light receiving portion held on a second holding surface 81*b* as a pair and which are arranged along sheet width direction, and the sensor unit detects the edge position of the sheet S while the holder drive portion moves the moving holder in the sheet width direction and every other light emitting portions in the plurality of pairs of sensors is turned on.

37 Claims, 9 Drawing Sheets

(56) References Cited

U.S. PATENT DOCUMENTS

| | | |
|---|---|---|
| 7,330,692 B2 | 2/2008 | Kohchi et al. |
| 8,348,270 B2 * | 1/2013 | Nishikata et al. ........ 271/265.03 |
| 2005/0129436 A1 | 6/2005 | Kohchi et al. |
| 2006/0104684 A1 | 5/2006 | Kohchi et al. |
| 2006/0232759 A1 | 10/2006 | Fukube et al. |

FOREIGN PATENT DOCUMENTS

| | | |
|---|---|---|
| EP | 1533660 A3 | 8/2005 |
| EP | 1533660 B1 | 8/2011 |
| JP | 5-132193 A | 5/1993 |
| JP | 09-191370 A | 7/1997 |
| JP | 2924751 B2 | 7/1999 |
| JP | 2002-131125 A | 5/2002 |
| JP | 2002-292960 A | 10/2002 |
| JP | 2006-201484 A | 8/2006 |
| JP | 2007-091369 A | 4/2007 |
| JP | 2007-197147 A | 8/2007 |
| JP | 2010-226690 A | 10/2010 |
| JP | 4608325 B2 | 1/2011 |
| JP | 4698363 B2 | 6/2011 |
| JP | 5316260 B2 | 10/2013 |

* cited by examiner

POSITION DETECTION APPARATUS AND IMAGE FORMING APPARATUS

BACKGROUND OF THE INVENTION

1. Field of the Invention

The present invention relates to a position detection apparatus which detects an edge position of a sheet passing through a sheet conveying path and an image forming apparatus including the position detection apparatus.

2. Description of the Related Art

Conventionally, there is an image forming apparatus, such as a copying machine and a printer, having a duplex printing function which forms an image on a first side of a sheet (hereinafter referred to as "simplex printing") and thereafter reverses the sheet and forms an image on a second side opposite to the first side (hereinafter referred to as "duplex printing").

When the duplex printing is performed in such an image forming apparatus, a sheet conveying path to a position at which the duplex printing is performed (for example, a path in which a sheet where the simplex printing has been completed is reversed and conveyed to an image forming unit) is longer than a path used for the simplex printing. Therefore, due to influence of a small alignment error of a conveying roller, deformation of a guide plate, and the like, there is a risk that the sheet gradually moves in a sheet width direction perpendicular to a sheet conveying direction and an image formed on the sheet is shifted in the sheet width direction.

To solve the above problem, a position detection apparatus is proposed which detects an amount of positional shift of an edge position in the sheet width direction of the sheet in the sheet conveying path by a line sensor and determines a print start position of the duplex printing based on the detection result (see Japanese Patent Laid-Open No. 2002-292960). In the position detection apparatus described in Japanese Patent Laid-Open No. 2002-292960, to detect edge position of sheets being conveyed from a minimum size to a maximum size, a line sensor is arranged in a line, light is irradiated from one side of the sheet, and the edge position in the sheet width direction is detected from a light blocking state.

However, the position detection apparatus described in Japanese Patent Laid-Open No. 2002-292960 detects the edge position in the sheet width direction of sheets of all sizes that can be conveyed, so that a line sensor that can detect the edge position in the sheet width direction of sheets of all sizes is required. Therefore, the cost of the sensor itself increases, causing a problem that the cost of the entire apparatus increases.

To solve the above problem, a position detection apparatus is proposed which detects the edge position in the sheet width direction perpendicular to the sheet conveying direction by using a moving holder having a pair of sensors that includes a light emitting portion and a light receiving portion (for example, a photo-interrupter) (see Japanese Patent Laid-Open No. 05-132193). The position detection apparatus described in Japanese Patent Laid-Open No. 05-132193 moves the moving holder in the sheet width direction so that the edge of the sheet traverses between the light emitting portion and the light receiving portion which are disposed to face each other, and detects the edge position in the sheet width direction by the distance from a reference position to a light path blocking position.

However, since the position detection apparatus described in Japanese Patent Laid-Open No. 05-132193 detects the edge position in the sheet width direction by one pair of sensors, it is necessary to secure a long moving distance of the moving holder to detect the edge position in the sheet width direction of sheets of a plurality of sizes. To secure the moving distance of the moving holder, for example, it is necessary to enlarge the moving mechanism and, therefore, there is a risk that the apparatus itself is enlarged.

To solve the above problem, for example, a plurality of pairs of sensors is arranged on the moving holder in the sheet width direction so that the pairs of sensors respectively correspond to the edge positions of sheets of a plurality of sizes. Accordingly, it is possible to shorten the moving distance of the moving holder and prevent the moving mechanism from being enlarged.

However, when a plurality of pairs of sensors is arranged in the sheet width direction, for example, light emitted from a light emitting portion may be received by a light receiving portion adjacent to a light receiving portion facing the light emitting portion and, therefore, there is a risk of detection error.

To solve the above problem, for example, a plurality of pairs of sensors is arranged at positions corresponding to the sizes of sheets to be conveyed. Only the pair of sensors arranged at a position corresponding to the size of a sheet to be conveyed is moved so that it is possible to prevent the detection error of the adjacent pair of sensors. However, if a plurality of pairs of sensors is moved, electric circuits, the number of which corresponds to the number of the pairs of sensors, are required. Accordingly, the cost increases and space for storing wiring is required. Also, there is a risk that the apparatus itself is enlarged.

Therefore, the present invention provides a position detection apparatus which can detect an edge position of a sheet in the sheet width direction with a high degree of accuracy using an inexpensive and simple configuration and an image forming apparatus including the position detection apparatus.

SUMMARY OF THE INVENTION

According to the present invention, there is provided a position detection apparatus including: a sensor unit which includes a light emitting portion and a light receiving portion and detects an edge position in a sheet width direction of a sheet conveyed in a sheet conveying path; a moving holder including a first holding surface that holds the light emitting portion of the sensor unit and a second holding surface that holds the light receiving portion which face each other so that the edge of the sheet passing through the sheet conveying path in the sheet width direction is enclosed, the moving holder being able to reciprocate in the sheet width direction; and a holder drive portion which drives the moving holder in the sheet width direction, wherein the sensor unit has a plurality of pairs of sensors, each of which includes the light emitting portion held on the first holding surface and the light receiving portion held on the second holding surface as a pair and which are arranged along the sheet width direction, and the sensor unit detects the edge position of the sheet while the holder drive portion moves the moving holder in the sheet width direction and every other light emitting portions in the plurality of pairs of sensors is turned on.

Further, according to the present invention, there is provided a position detection apparatus including: a sensor unit which includes a light emitting portion and a light receiving portion and detects an edge position in a sheet width direction of a sheet conveyed in a sheet conveying path; a moving holder including a first holding surface that holds the light emitting portion of the sensor unit and a second holding surface that holds the light receiving portion which face each other so that the edge of the sheet passing through the sheet conveying path in the sheet width direction is enclosed, the moving holder being able to reciprocate in the sheet width direction; and a holder drive portion which drives the moving holder in the sheet width direction, wherein the sensor portion has a plurality of pairs of sensors, each of which includes the light emitting portion disposed on the first holding surface and the light receiving portion disposed on the second holding surface as a pair and which are arranged along the sheet width direction, and a light emitting portion corresponding to the edge position in the sheet width direction of the detected type of the sheet is turned on and, at least light emitting portions adjacent to the light emitting portion that is turned on are turned off.

According to the present invention, it is possible to detect an edge position of a sheet in the sheet width direction with a high degree of accuracy using an inexpensive and simple configuration.

Further features of the present invention will become apparent from the following description of exemplary embodiments with reference to the attached drawings.

DESCRIPTION OF THE EMBODIMENTS

Hereinafter, an image forming apparatus according to an embodiment of the present invention will be described with reference to the drawings. The image forming apparatus according to the embodiment of the present invention is an image forming apparatus, such as a copying machine, a printer, a facsimile, and a multifunction device having functions thereof, which includes a sheet edge detection portion that can detect an edge position in the sheet width direction of a sheet passing through a reverse conveying path serving as a sheet conveying path. In the embodiment described below, a laser beam printer 1 will be described as the image forming apparatus.

First Embodiment

Figure 1:
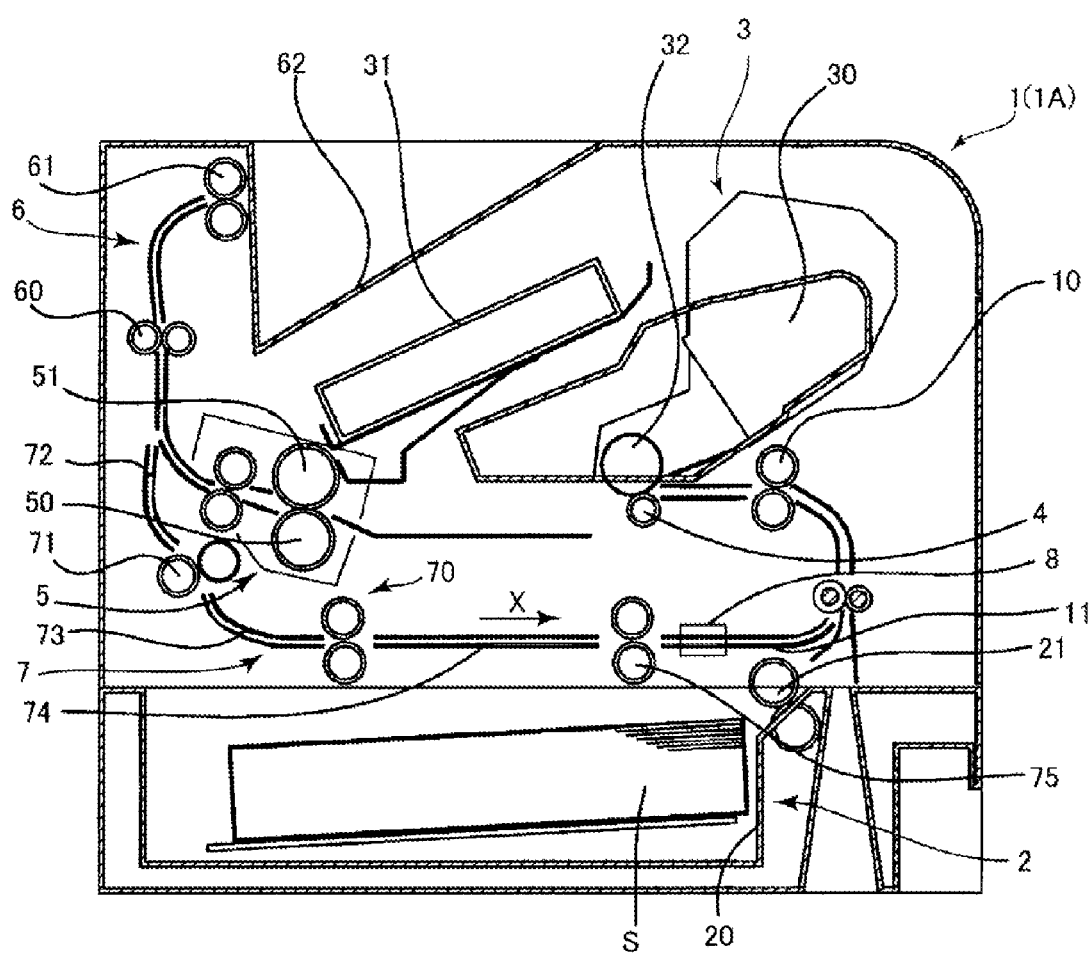
FIG. 1 is a cross-sectional view schematically illustrating an entire structure of a laser beam printer according to an embodiment of the present invention.

The laser beam printer 1 according to a first embodiment of the present invention will be described with reference to FIGS. 1 to 9. First, an entire structure of the laser beam printer 1 will be described with reference to FIG. 1 in line with a movement of a sheet on which an image is formed. FIG. 1 is a cross-sectional view schematically illustrating the entire structure of the laser beam printer 1 according to the embodiment of the present invention.

As illustrated in FIG. 1, the laser beam printer 1 includes a sheet feed portion 2 that feeds a sheet S, an image forming portion 3 that forms an image, a transfer portion 4 that transfers an image to the sheet S fed from the sheet feed portion 2, and a fixing portion 5 that fixes the image transferred to the sheet S. The laser beam printer 1 further includes a discharge portion 6 that discharges the sheet S to which the image is fixed and a reverse conveying portion 7 that reverses the sheet S and conveys the sheet to perform duplex printing on the sheet S on which simplex printing has been performed.

The sheet feed portion 2 includes a sheet cassette 20 that stores the sheet S, a pair of feed rollers 21 that feeds the sheet S stored in the sheet cassette 20 to the image forming portion 3, and a separation portion (not shown in FIG. 1) that separates the sheets S one by one. The sheet feed portion 2 separates the sheets S stored in the sheet cassette 20 one by one at the separation portion and feeds the sheet S to the image forming portion 3 by the pair of feed rollers 21.

The image forming portion 3 includes a process cartridge 30 and an exposure portion 31. The process cartridge 30 includes a photosensitive drum 32, a charging portion (not shown in FIG. 1), and a developing portion (not shown in FIG. 1). The photosensitive drum 32 is formed by a metal cylinder including a photosensitive layer, having negative charge polarity, on the surface thereof. The charging portion uniformly charges the drum surface of the photosensitive drum 32, which is an image bearing member. The exposure portion 31 irradiates a laser beam based on image information and forms an electrostatic latent image on the photosensitive drum 32. The exposure portion 31 includes a correction apparatus (not shown in FIG. 1) that corrects a position (an image forming position) of the electrostatic latent image formed on the photosensitive drum 32 according to the edge position in the sheet width direction of a sheet detected by a sheet edge detection portion 8 described later. The developing portion attaches toner to the electrostatic latent image formed by the exposure portion 31 to visualize the electrostatic latent image as a toner image.

The transfer portion 4 includes a transfer roller and forms a nip with the photosensitive drum 32. The transfer portion 4 transfers a toner image formed on the photosensitive drum 32 to the sheet S conveyed to the nip between the transfer portion 4 and the photosensitive drum 32 at a predetermined timing by a pair of resist rollers 10.

The fixing portion 5 includes a drive roller 50 and a fixing roller 51 having a heater therein. The fixing portion 5 applies heat and pressure to the sheet S to which the unfixed toner image is transferred by the transfer portion 4, and fixes the unfixed toner image to the sheet S.

The discharge portion 6 includes a pair of inner discharge rollers 60, an outer discharge roller 61, and a discharge tray 62. The discharge portion 6 discharges the sheet S after simplex printing or duplex printing onto the discharge tray 62 through the pair of inner discharge rollers 60 and the outer discharge roller 61.

The reverse conveying portion 7 includes a reversing unit 70 that reverses front and back (first side and second side) of the sheet S when performing duplex printing and a sheet edge detection portion 8, serving as a position detection device, that detects the edge position in the sheet width direction of the sheet S reversed by the reversing unit 70. The laser beam printer 1 according to the present embodiment has a duplex printing mode for performing duplex printing in addition to a simplex printing mode for performing simplex printing. The reverse conveying portion 7 is used when the duplex printing is performed.

The reversing unit 70 includes a pair of switch back rollers 71, a re-feed path 72, a duplex conveying path 73, an intermediate tray 74, and a pair of re-feed rollers 75. The sheet S on which the duplex printing is performed is reversed to the second side opposite to the first side by the pair of inner discharge rollers 60 or the pair of switch back rollers 71. The reversed sheet S is temporarily stored on the intermediate tray 74 through the re-feed path 72 and the duplex conveying path 73. The sheet S stored on the intermediate tray 74 is then re-conveyed to the image forming portion 3 at a predetermined timing to form an image by the pair of re-feed rollers 75. Thereafter, the sheet S is discharged onto the discharge tray 62 through the same process as that of the simplex printing.

The sheet edge detection portion 8 is provided on a reverse conveying path 11 positioned downstream of the pair of re-feed rollers 75. The sheet edge detection portion 8 detects the edge position in a sheet width direction Y of a sheet shifted in the direction (Y direction in FIG. 2, hereinafter referred to as "sheet width direction Y") perpendicular to the sheet conveying direction (X direction in FIG. 1, hereinafter referred to as "sheet conveying direction X").

Figure 2:
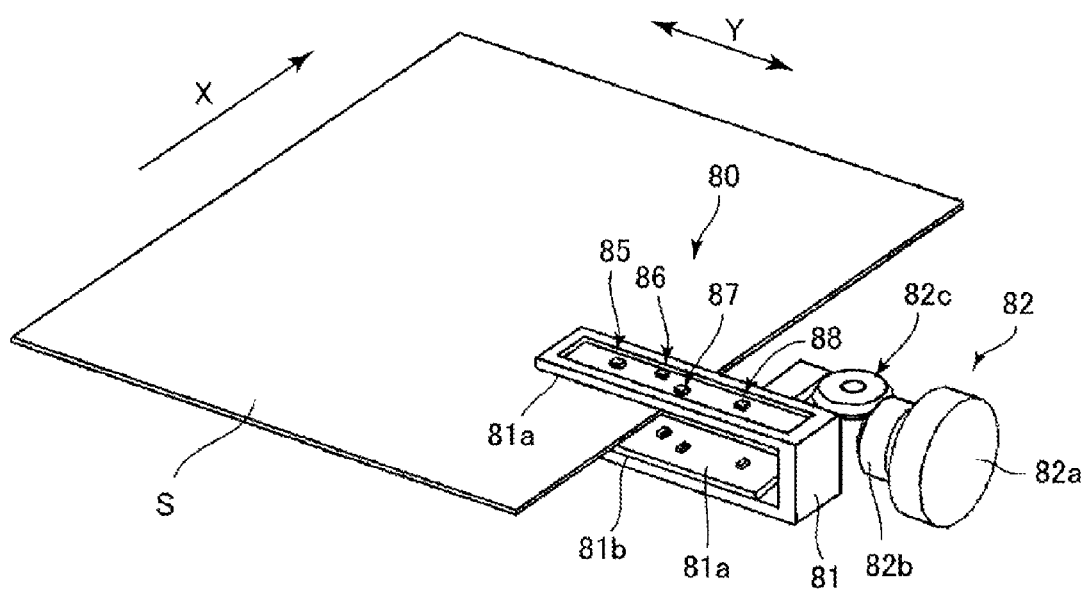
FIG. 2 is a perspective view illustrating a sheet edge detection portion of the laser beam printer according to the present embodiment.
Figure 3:
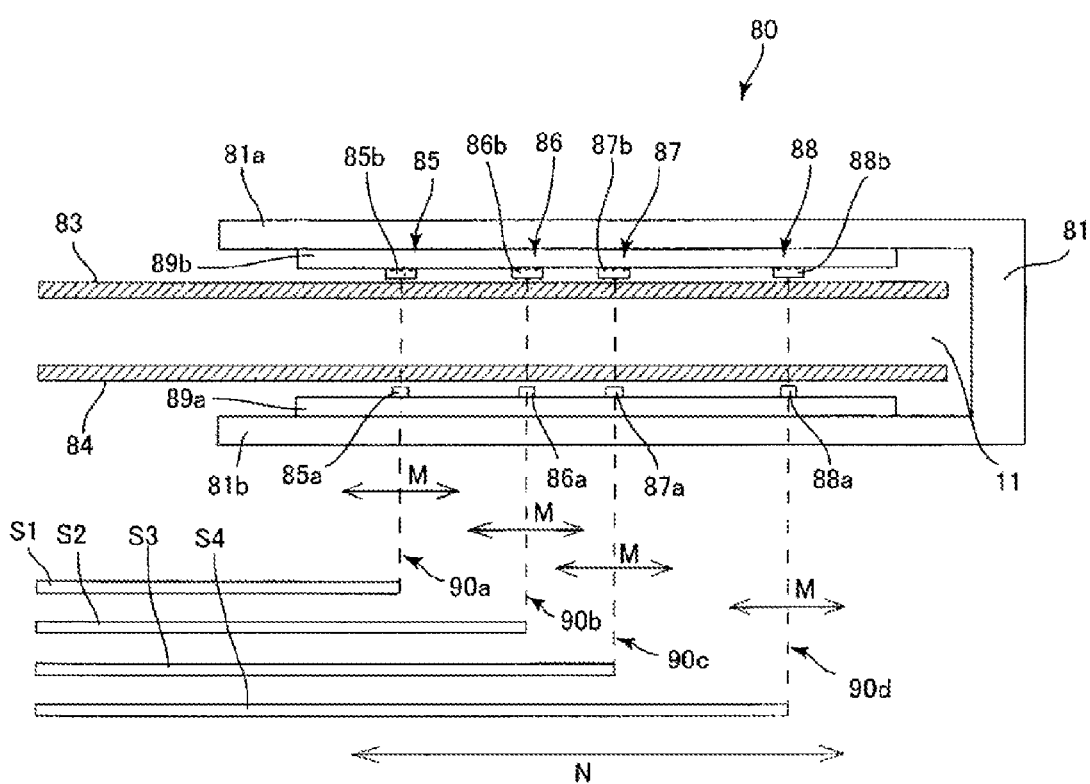
FIG. 3 is a partial enlarged cross-sectional view of a sensor unit of the sheet edge detection portion illustrated in FIG. 2.

Here, the sheet edge detection portion 8 according to the first embodiment will be described with reference to FIGS. 2 to 9. First, the configuration of the sheet edge detection portion 8 will be described with reference to FIGS. 2 and 3. FIG. 2 is a perspective view illustrating the edge detection portion 8 of the laser beam printer 1 according to the present embodiment. FIG. 3 is a partial enlarged cross-sectional view of a sensor unit 80 of the sheet edge detection portion 8 illustrated in FIG. 2.

As illustrated in FIGS. 2 and 3, the sheet edge detection portion 8 includes a moving holder 81 that can reciprocate in the sheet width direction Y, a drive unit 82 functioning as a holder drive portion that reciprocates the moving holder 81, and a pair of conveying guides 83 and 84. The sheet edge detection portion 8 also includes the first to the fourth pairs of sensors 85, 86, 87, and 88 which are arranged along the sheet width direction and detect presence or absence of the sheet, and a detection portion 91 that detects the type of the sheet passing through the reverse conveying path 11. The moving holder 81 and the first to the fourth pairs of sensors 85 to 88 constitute the sensor unit 80 functioning as a sensor portion. The sensor unit 80 moves in the sheet width direction Y, so that the sensor unit 80 searches for presence or absence of the sheet in the sheet width direction Y and detects the edge position in the sheet width direction.

The moving holder 81 has a substantially squared U-shaped cross section in the sheet width direction Y. The moving holder 81 includes an upper surface 81a as a first holding surface and a lower surface 81b as a second holding surface. The upper surface 81a and the lower surface 81b are disposed to face each other so that the upper surface 81a and the lower surface 81b enclose both sides of the sheet. The upper surface 81a and the lower surface 81b are formed apart from each other by a predetermined distance so that the sheet can pass between the upper surface 81a and the lower surface 81b. The moving holder 81 is configured to be able to reciprocate in the sheet width direction Y, and the upper surface 81a and the lower surface 81b reciprocate in the sheet width direction Y in an integrated manner.

The drive unit 82 includes a stepping motor 82a, a pinion 82b connected to the stepping motor 82a, and a drive column 82c that engages with the pinion 82b. The drive column 82c is linked to the moving holder 81. When the stepping motor 82a is rotated, the drive column 82c engaging with the pinion 82b is driven and the moving holder 81 reciprocates in the sheet width direction Y.

In the present embodiment, the drive unit 82 reciprocates the moving holder 81 by a predetermined stroke M necessary to detect the edge position in the sheet width direction Y of a plurality of types of sheets S1, S2, S3, and S4. The predetermined stroke M is a distance of reciprocating movement around a reference position to be described later based on a predetermined maximum shift width, by which each of the plurality of types of sheets S1, S2, S3, and S4 can shift in the sheet width direction Y.

The pair of conveying guides 83 and 84 includes a first conveying guide 83 having a rectangular plate shape and a second conveying guide 84 having a rectangular plate shape. The first conveying guide 83 is disposed on the side of the upper surface 81a of the moving holder 81 between the upper surface 81a and the lower surface 81b of the moving holder 81. The second conveying guide 84 is disposed on the side of the lower surface 81b of the moving holder 81 and in a position which is predetermined distance apart from the first conveying guide 83 so that the sheet S can pass through. Thereby, the pair of conveying guides 83 and 84 constitutes the reverse conveying path 11 through which the sheet S can pass. The first conveying guide 83 and the second conveying guide 84 are formed of a transparent material in order to transmit light from first to the fourth LED elements 85a, 86a, 87a, and 88a, which are to be described later, included in the first to the fourth pairs of sensors 85 to 88.

The first to the fourth pairs of sensors 85 to 88 include the first to the fourth LED elements 85a to 88a as light emitting portions and the first to the fourth light receiving elements 85b, 86b, 87b, and 88b as light receiving portions. The first to the fourth LED elements 85a to 88a are arranged along the sheet width direction Y and held on the lower surface 81b of the moving holder 81 via a sensor substrate 89a. The first to the fourth light receiving elements 85b to 88b are arranged along the sheet width direction Y and held on the upper surface 81a of the moving holder 81 via a sensor substrate 89b.

The first to the fourth pairs of sensors 85 to 88 are disposed on reference positions through which the edges in the sheet width direction of a plurality of types (A size, B size, and the like) of sheets S1 to S4 having predetermined different lengths in the sheet width direction Y can pass. Specifically, the first pair of sensors 85 is disposed on a reference position of the sheet S1 and the second pair of sensors 86 is disposed on a reference position of the sheet S2. The third pair of sensors 87 is disposed on a reference position of the sheet S3 and the fourth pair of sensors 88 is disposed on a reference position of the sheet S4.

Here, the reference positions are positions through which the edges in the sheet width direction pass when the plurality of types of sheets S1 to S4 are conveyed in the reverse conveying path 11 without being shifted in the sheet width direction. In the present embodiment, a dashed line 90a illustrated in FIG. 3 is the reference position of the sheet S1 and a dashed line 90b is the reference position of the sheet S2. In the same manner, a dashed line 90c illustrated in FIG. 3 is the reference position of the sheet S3 and a dashed line 90d is the reference position of the sheet S4.

In this way, in the present invention, a plurality of pairs of sensors corresponding to the sizes of the sheets that can be used are arranged at respective reference positions. In the present embodiment, the first to the fourth pairs of sensors 85 to 88 that can be used for the sizes of the four sheets S1 to S4 are arranged at the reference positions (dashed lines 90a to 90d) respectively.

Figure 4:
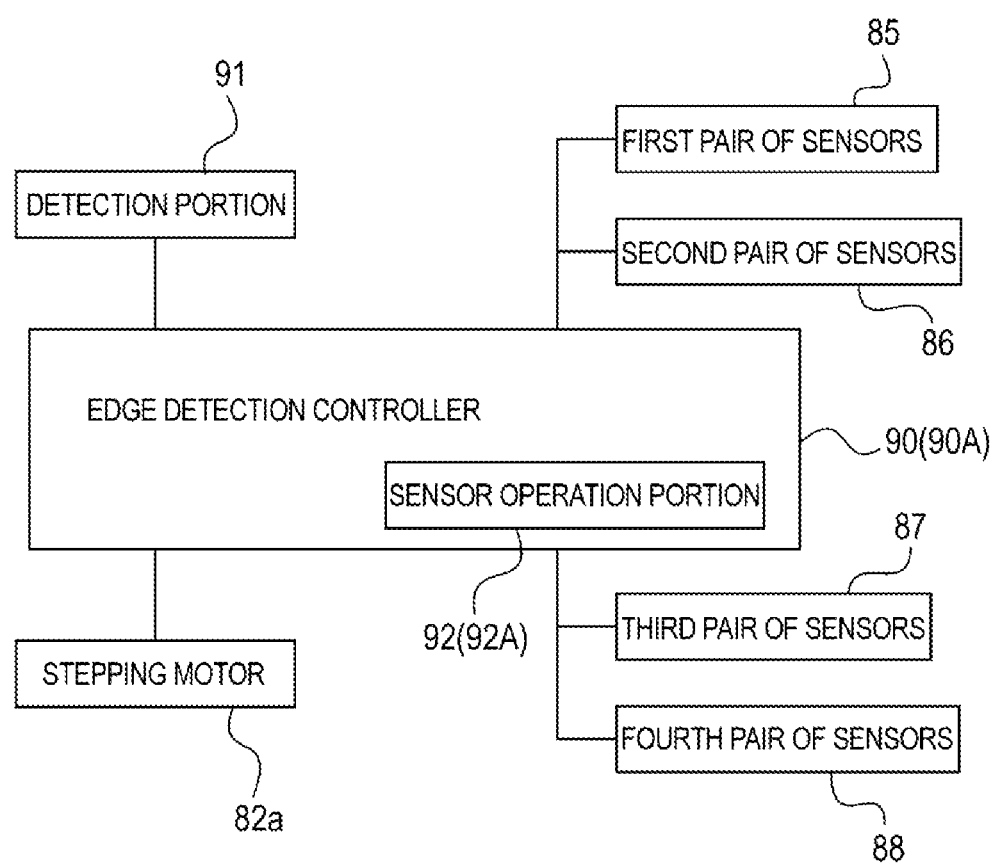
FIG. 4 is a block diagram illustrating an edge detection controller that controls the sheet edge detection portion.

Next, an edge detection controller 90 constituting a sensor portion that controls the sheet edge detection portion 8 will be described with reference to FIG. 4. FIG. 4 is a block diagram illustrating the edge detection controller 90 that controls the sheet edge detection portion 8.

As illustrated in FIG. 4, the edge detection controller 90 includes a sensor operation portion 92 and is electrically connected to the first to the fourth pairs of sensors 85 to 88, a detection portion 91, and the stepping motor 82a. The sensor operation portion 92 determines the type of the sheet detected by the detection portion 91. The sensor operation portion 92 then turns on the LED element of the pair of sensors disposed at the reference position corresponding to the type of the sheet and turns off LED elements adjacent to the LED element of the reference position. For example, if the sheet detected by the detection portion 91 is the sheet S2, the sensor operation portion 92 causes the second LED element 86a of the second pair of sensors 86 to emit light and causes the first LED element 85a of the first pair of sensors 85 and the third LED element 87a of the third pair of sensors 87 to emit no light (see FIG. 7 to be described later). Then, the edge detection controller 90 controls the stepping motor 82a of the drive unit 82 and reciprocates the moving holder 81 by a predetermined stroke M.

Figure 5A:
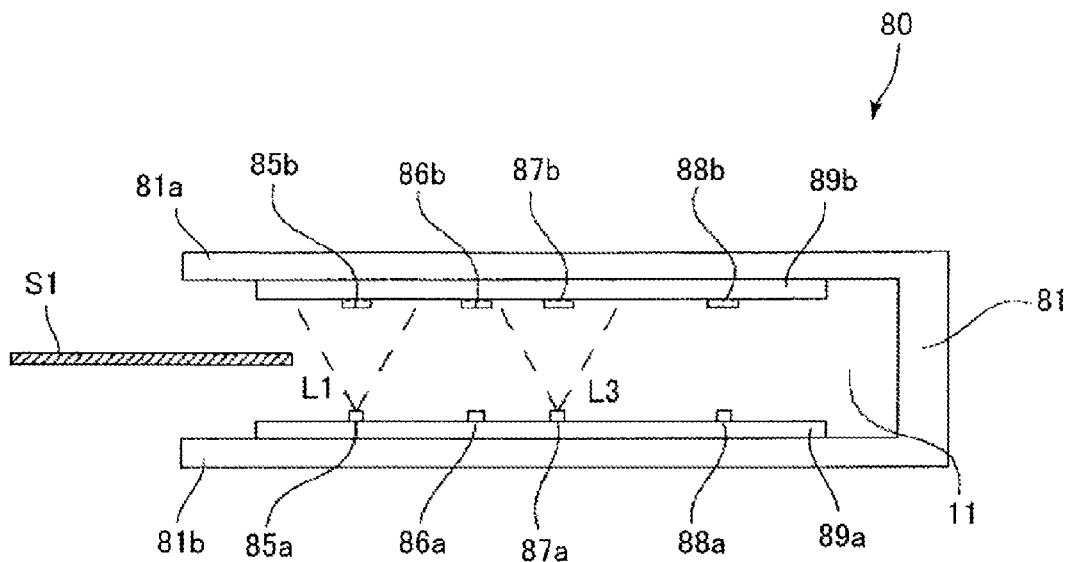
FIG. 5A is a diagram illustrating a state in which a sheet passes through a reverse conveying path inside the sensor unit of the sheet edge detection portion.
Figure 5B:
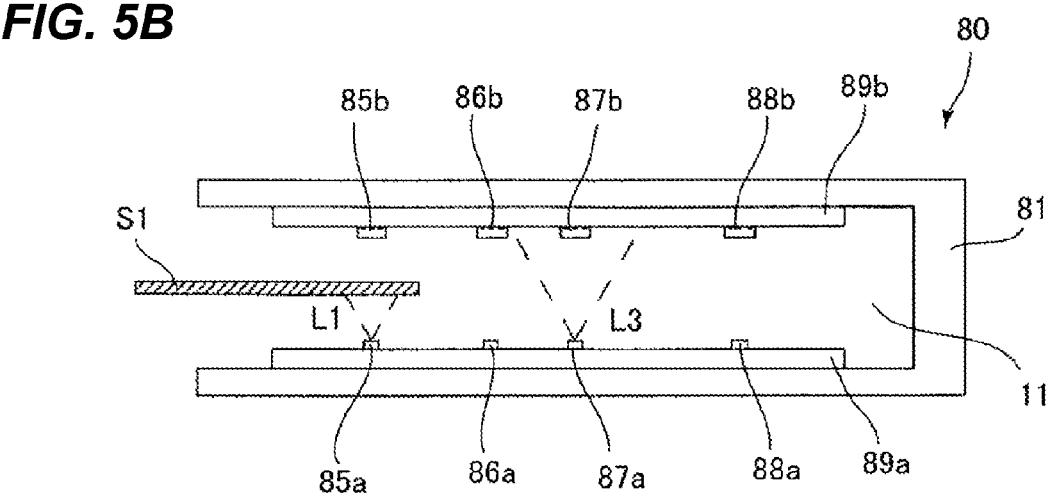
FIG. 5B is a diagram illustrating a state in which the sensor unit moves and the sheet covers a light emitting element.
Figure 6:
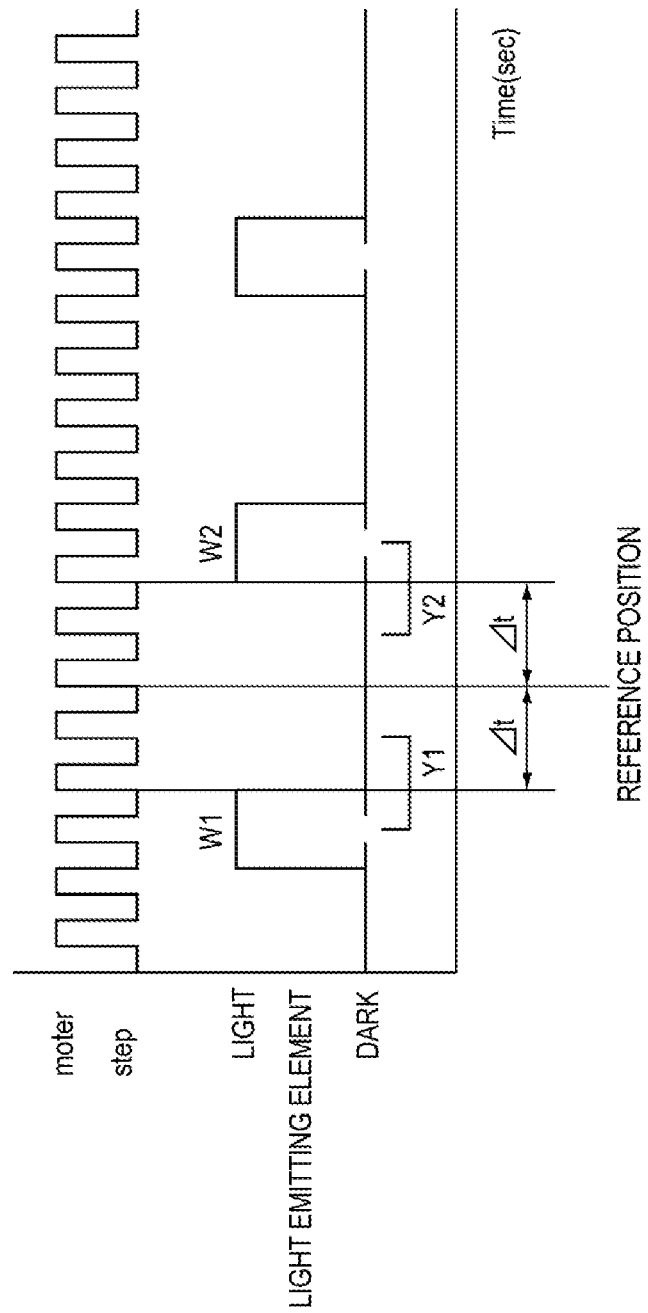
FIG. 6 is a diagram illustrating a moving position of the moving holder and a covered state of the pairs of sensors.
Figure 7:
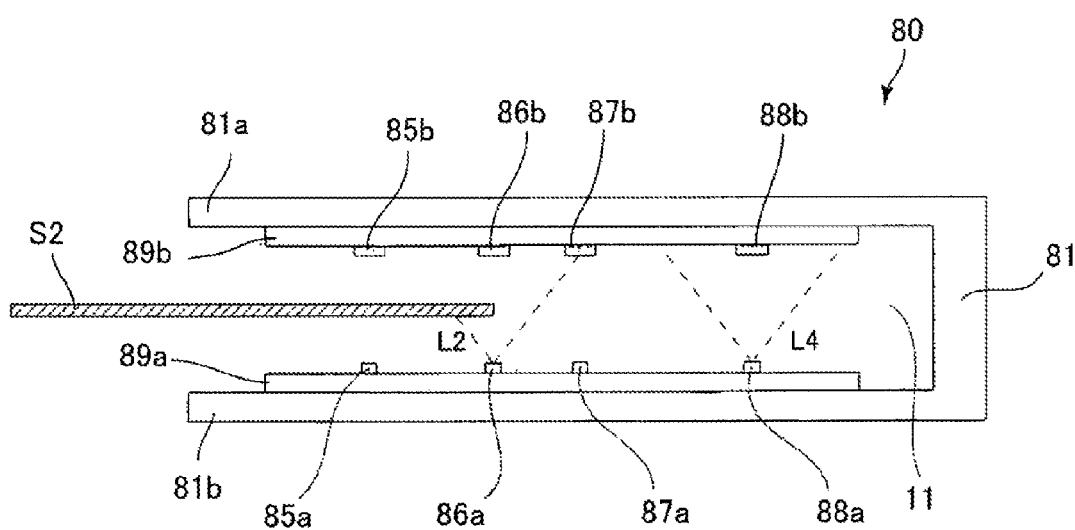
FIG. 7 is a diagram illustrating a state in which the moving holder is moved with respect to a sheet passing through the reverse conveying path.
Figure 8:
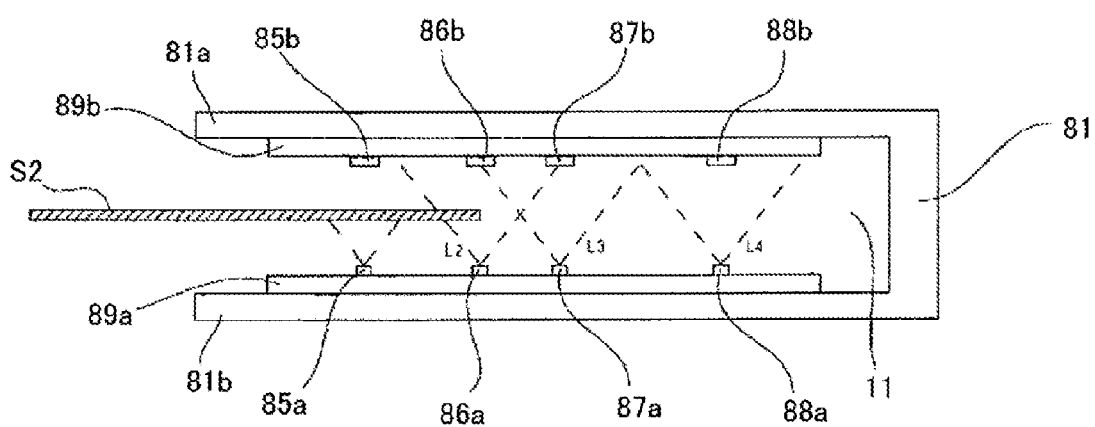
FIG. 8 is a diagram illustrating a state in which the sheet passes through inside the sensor unit while all light emitting elements emit light.
Figure 9:
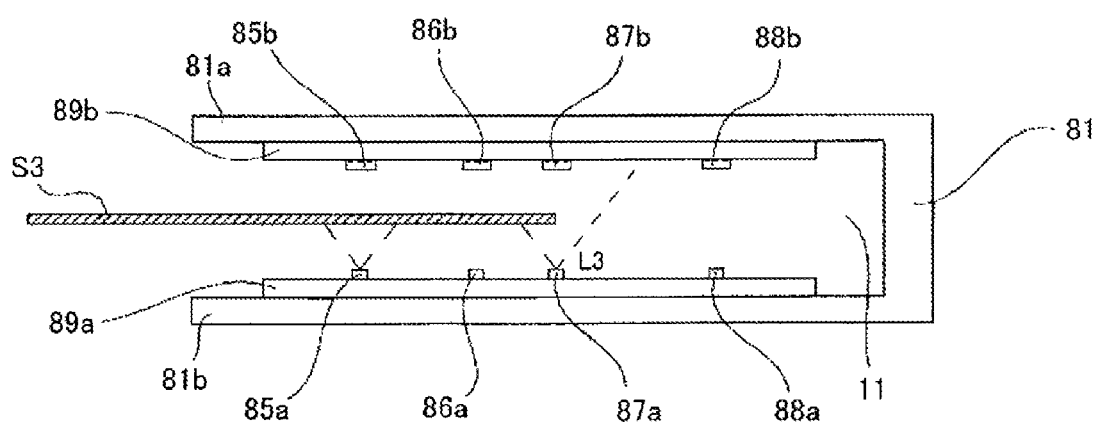
FIG. 9 is a diagram illustrating a state in which a different type of sheet passes through inside the sensor unit.

Next, the operation of the sheet edge detection portion 8 will be described with reference to FIGS. 5A to 9 in addition to FIG. 3. FIG. 5A is a diagram illustrating a state in which the sheet passes through the reverse conveying path 11 inside the sensor unit 80 of the sheet edge detection portion 8. FIG. 5B is a diagram illustrating a state in which the sensor unit 80 moves and the sheet S1 covers the LED element 85a. FIG. 6 is a diagram illustrating a moving position of the moving holder 81 and a covered state of the pairs of sensors. FIG. 7 is a diagram illustrating a state in which the moving holder 81 is moved with respect to the sheet S2 passing through the reverse conveying path 11. FIG. 8 is a diagram illustrating a state in which the sheet S2 passes through inside the sensor unit 80 while all the LED elements emit light. FIG. 9 is a diagram illustrating a state in which a different type of sheet S3 passes through inside the sensor unit 80.

In order to detect how the sheet S blocks light by a smaller operating area, the sheet edge detection portion 8 needs to quickly reciprocate the moving holder 81 (the sensor unit 80) in which the first to the fourth pairs of sensors 85 to 88 are arranged. Therefore, the sensor unit 80 reciprocates the moving holder 81 with the driving unit by a predetermined stroke M necessary to detect the edge position in the sheet width direction of one sheet (see FIG. 3).

When the moving holder 81 reciprocates, the first to the fourth pairs of sensors 85 to 88 fixed to the moving holder 81 also reciprocate at the same time. Thereby, the moving distance of the moving holder 81 covers a distance N from the maximum size to the minimum size of the sheets conveyed from the reversing unit 70 and one of the light paths from which the first to the fourth light receiving elements 85b to 88b receive light traverses the edge of one of the conveyed sheets S1 to S4.

The position of the moving holder 81 while the moving holder 81 reciprocates is calculated by the number of pulses that drive the stepping motor 82a from the initial position of the moving holder 81 before beginning the reciprocation. For example, the edge position of the sheet S1 is calculated based on the number of pulses of the stepping motor 82a from the reference initial position to a position at which the edge position in the sheet width direction of the sheet S1 is detected by the first LED element 85a and the first light receiving element 85b while the moving holder 81 is moving.

When the moving holder 81 moves from the position illustrated in FIG. 5A to the position illustrated in FIG. 5B, the sheet S1 blocks the light path L1 formed by the first LED element 85a and the first light receiving element 85b. Therefore, as illustrated by an area Y1 in FIG. 6, in the first light receiving element 85b, a light-to-dark change of the light occurs, so that the first pair of sensors 85 can detect that the change point W1 is the edge position in the sheet width direction of the sheet S1. Similarly, when the moving holder 81 moves from the position illustrated in FIG. 5B to the position illustrated in FIG. 5A, the sheet S1 disappears from the light path L1. Therefore, as illustrated by the area Y2 in FIG. 6, in the first light receiving element 85b, a dark-to-light change occurs, so that the first pair of sensors 85 can detect that the change point W2 is the edge position in the sheet width direction of the sheet S1. Thereafter, the above operation is repeatedly performed and an average of the edge positions is calculated, and accordingly, an accurate edge position in the sheet width direction of the sheet S1 can be detected.

To determine the origin position of the moving holder 81, in an area outside the sheet conveyance area, the reference position of the first pair of sensors 85 and an initial value of the drive pulses of the stepping motor 82a are set by a known method, and the edge position of the sheet S1 is calculated from Δt illustrated in FIG. 6. In this way, the edge position of the sheet S1 can be detected from the light and dark of the light in the first light receiving element 85b of the first pair of sensors 85. At this time, since the second LED element 86a of the second pair of sensors 86 is turned off, the risk of a detection error made by the first LED element 85a is reduced even when the first LED element 85a is located in an irradiation range of the second LED element 86a.

Similarly, when the sheet S2 passes through, the edge position can be detected from the light and dark of the light in the second light receiving element 86b of the second pair of sensors 86. When the sheet S3 passes through, the edge position can be detected from the light and dark of the light in the third light receiving element 87b of the third pair of sensors 87. When the sheet S4 passes through, the edge position can be detected from the light and dark of the light in the fourth light receiving element 88b of the fourth pair of sensors 88.

For example, as illustrated in FIG. 8, if all of the first to the fourth LED elements 85a to 88a of the first to the fourth pairs of sensors 85 to 88 are turned on, the light of the light path L3 from the third LED element 87a is also irradiated when detecting the sheet S2. Therefore, the second light receiving element 86b is difficult to be detected, so that the detection accuracy decreases. However, the sheet edge detection portion 8 of the first embodiment causes the LED element of the pair of sensors disposed at the reference position of the passing sheet to emit light, and causes LED elements adjacent to the LED element of the reference position to emit no light. For example, as illustrated in FIG. 9, when the sheet S2 passes through, the sheet edge detection portion 8 turns on the second LED element 86a of the second pair of sensors 86 disposed at a position corresponding to the sheet S2 and turns off the first LED element 85a and the third LED element 87a which are adjacent to the second LED element 86a. Thereby, it is possible to prevent the second pair of sensors 86 that detects the edge position of the sheet S2 from causing a detection error, and therefore, it is possible to accurately detect the edge position of the sheet without degrading the degree of detection accuracy.

As a result, for example, it is possible to correct the exposure position of the electrostatic latent image, which is formed on the photosensitive drum 32 by the exposure portion 31, by a correction apparatus not shown in the drawings based on sheet position information from the pair of sensors, and an appropriate image without horizontal shift can be obtained. Further, the exposure position is corrected based on an average of the edge positions of the sheet, which are detected a plurality of times, so that it is possible to form a more accurate image.

The sheet edge detection portion 8 of the first embodiment reciprocates the moving holder 81 holding the first to the fourth pairs of sensors 85 to 88 to detect the edge position in the sheet width direction Y of the four types of sheets S1 to S4. Therefore, for example, it is possible to reduce the number of pairs of sensors compared with a case in which a line sensor is used, and accordingly the cost can be reduced. The first to the fourth pairs of sensors 85 to 88 are moved by a predetermined stroke M, so that it is possible to detect the edge position by a simple reciprocation movement of a small stroke. Therefore, for example, the configuration of the drive unit 82 can be simplified and a complex moving mechanism is not required. Further, it is possible to prevent the moving mechanism and the apparatus itself from becoming large because the moving distance is short.

It is not necessary to use a complex control, such as, for example, causing a photo-interrupter to wait in a range where the photo-interrupter does not overlap a conveyed sheet and causing, after detecting the edge position of the sheet, the photo-interrupter to be stopped before the photo-interrupter hits the edge of the sheet.

In the sheet edge detection portion 8 of the first embodiment, since the first to the fourth pairs of sensors 85 to 88 are held in the moving holder 81 and moved in an integrated manner, it is not necessary to secure a space for a plurality of electrical circuits and wiring required in a case in which each pair of sensors is moved individually. Thereby, it is possible to reduce the cost and prevent the apparatus from becoming large.

As described above, the sheet edge detection portion 8 according to the first embodiment can detect the position of the sheet with a high degree of accuracy using an inexpensive and simple configuration without becoming large.

Second Embodiment

Next, a laser beam printer 1A according to a second embodiment of the present invention will be described with reference to FIGS. 1 to 9. In the laser beam printer 1A according to the second embodiment, an edge detection controller 90A that controls the first to the fourth pairs of sensors 85 to 88 is different from the edge detection controller 90A of the first embodiment. Therefore, in the second embodiment, the point different from the first embodiment, that is, the edge detection controller 90A, will be mainly described. The same components as those in the laser beam printer 1 according to the first embodiment are given the same reference numerals and symbols, and the descriptions thereof will not be repeated. In other words, in the second embodiment, the same components as those in the first embodiment have the same effects as those in the first embodiment.

As illustrated in FIG. 4, the edge detection controller 90A according to the second embodiment includes a sensor operation portion 92A and is electrically connected to the first to the fourth pairs of sensors 85 to 88, the detection portion 91, and the stepping motor 82a. The sensor operation portion 92A determines the type of the sheet detected by the detection portion 91 and turns on every other LED element from the LED element of the pair of sensors disposed at the reference position corresponding to the type of the sheet. For example, if the sheet detected by the detection portion 91 is the sheet S2, the sensor operation portion 92A causes the second LED element 86a of the second pair of sensors 86 and the fourth LED element 88a of the fourth pair of sensors 88 to emit light. Similarly, the sensor operation portion 92A causes the first LED element 85a of the first pair of sensors 85 and the third LED element 87a of the third pair of sensors 87 to emit no light (see FIG. 7). Then, the edge detection controller 90A controls the stepping motor 82a of the drive unit 82 and reciprocates the moving holder 81 by a predetermined stroke M.

In this way, every other LED element is turned on from the LED element of the pair of sensors corresponding to the conveyed sheet, so that, for example, switching elements and substrates can be reduced to two types for odd rows and even rows. Thereby the cost can be reduced.

An embodiment in which the type of the sheet detected by the detection portion 91 is determined and every other LED element is turned on from the LED element of the pair of sensors disposed at the reference position corresponding to the type of the sheet is illustrated by an example. However, the edge position of the sheet may be detected by switching between a state in which light is emitted from odd rows and a state in which light is emitted from even rows while one sheet is being conveyed without determining the type (size) of the sheet in advance.

Although the embodiments of the present invention have been described, the present invention is not limited to the embodiments described above. The effects described in the embodiments of the present invention are only a list of best suited effects generated from the present invention, and the effects of the present invention are not limited to those described in the embodiments of the present invention.

For example, although, in the present embodiments, the sheet edge detection portion 8 is provided on the reverse conveying path 11 of the reverse conveying portion 7, it is not limited to this in the present invention. For example, the sheet edge detection portion 8 may be provided between the sheet feed portion 2 and the image forming portion 3.

Although, in the present embodiments, the LED element of the pair of sensors disposed at the reference position corresponding to the type of the sheet detected by the detection portion 91 is turned on and LED elements adjacent to the LED element of the reference position are turned off, it is not limited to this in the present invention. For example, the other LED elements other than the LED element of the reference position may be turned off. Or, at least LED elements located in the irradiation range of the LED element of the reference position may be turned off.

Although, in the present embodiments, the first to the fourth pairs of sensors 85 to 88 are disposed on the reference positions through which the edges in the sheet width direction of the sheets S1 to S4 can pass, it is not limited to this in the present invention. The first to the fourth pairs of sensors 85 to 88 may be disposed to be able to detect the edge position in the sheet width direction of the sheets S1 to S4. For example, the first to the fourth pairs of sensors 85 to 88 may be disposed at regular intervals if the first to the fourth pairs of sensors 85 to 88 can detect the edge position.

Although the present embodiments are described using the four pairs of sensors, that is, the first to the fourth pairs of sensors 85 to 88, it is not limited to this in the present invention. A plurality of pairs of sensors only has to be included. For example, the number of the pairs of sensors may be the same as that of the sheet sizes that can be conveyed in the image forming apparatus.

Although, in the present embodiments, the detection portion 91 determines the type of the sheet, it is not limited to this in the present invention. For example, the type of the sheet (the size of the sheet) may be directly input from a personal computer or the like connected to the laser beam printer 1 or information related to the type of the sheet is input from an operation panel of the laser beam printer 1.

Although, in the present embodiments, an LED element is used as the light emitting portion, it is not limited to this in the present invention. The light emitting portion only has to emit light that can be received by the light receiving portion. Although the stepping motor 82*a* is used in the drive unit 82 that moves the moving holder 81, it is not limited to this in the present invention. Anything that can drive the moving holder 81 may be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2011-179664, filed Aug. 19, 2011, which is hereby incorporated by reference herein in its entirety.

What is claimed is:

1. A position detection apparatus comprising:
a sensor unit which includes a light emitting portion and a light receiving portion and detects an edge position in a sheet width direction of a sheet conveyed in a sheet conveying path;
a moving holder including a first holding surface that holds the light emitting portion of the sensor unit and a second holding surface that holds the light receiving portion which face each other so that the edge of the sheet passing through the sheet conveying path in the sheet width direction is enclosed, the moving holder being able to reciprocate in the sheet width direction; and
a holder drive portion which drives the moving holder in the sheet width direction,
wherein the sensor unit has a plurality of pairs of sensors, each of which includes the light emitting portion held on the first holding surface and the light receiving portion held on the second holding surface as a pair and which are arranged along the sheet width direction, and
the sensor unit detects the edge position of the sheet while the holder drive portion moves the moving holder in the sheet width direction and every other light emitting portions in the plurality of pairs of sensors is turned on.

2. The position detection apparatus according to claim 1, wherein
the plurality of pairs of sensors are disposed in the moving holder so that the pairs of sensors are respectively located on a plurality of reference positions corresponding to a plurality of types of sheets having different sizes in the width direction, and
the sensor unit detects the edge position of the sheet passing through while the holder drive portion reciprocates the moving holder in the sheet width direction by a predetermined amount set in advance.

3. The position detection apparatus according to claim 1, further comprising:
a detection portion which detects a type of the sheet passing through the sheet conveying path,
wherein a light emitting portion that is turned on among the plurality of light emitting portions is determined according to the type of the sheet detected by the detection portion.

4. The position detection apparatus according to claim 1, wherein
the light emitting portion includes an LED element.

5. A position detection apparatus comprising:
a sensor unit which includes a light emitting portion and a light receiving portion and detects an edge position in a sheet width direction of a sheet conveyed in a sheet conveying path;
a moving holder including a first holding surface that holds the light emitting portion of the sensor unit and a second holding surface that holds the light receiving portion which face each other so that the edge of the sheet passing through the sheet conveying path in the sheet width direction is enclosed, the moving holder being able to reciprocate in the sheet width direction; and
a holder drive portion which drives the moving holder in the sheet width direction,
wherein the sensor unit has a plurality of pairs of sensors, each of which includes the light emitting portion disposed on the first holding surface and the light receiving portion disposed on the second holding surface as a pair and which are arranged along the sheet width direction, and
a light emitting portion corresponding to the edge position in the sheet width direction of the detected type of the sheet is turned on and, at least light emitting portions adjacent to the light emitting portion that is turned on are turned off.

6. The position detection apparatus according to claim 5, wherein
the plurality of pairs of sensors are disposed in the moving holder so that the pairs of sensors are respectively located on a plurality of reference positions corresponding to a plurality of types of sheets having different sizes in the width direction, and
the sensor unit detects the edge position of the sheet passing through while the holder drive portion reciprocates the moving holder in the sheet width direction by a predetermined amount set in advance.

7. The position detection apparatus according to claim 5, further comprising:
a detection portion which detects a type of the sheet passing through the sheet conveying path.

8. The position detection apparatus according to claim 5, wherein
the light emitting portion includes an LED element.

9. An image forming apparatus comprising:
a position detection apparatus including
a sensor unit which includes a light emitting portion and a light receiving portion and detects an edge position in a sheet width direction of a sheet conveyed in a sheet conveying path,
a moving holder including a first holding surface that holds the light emitting portion and a second holding surface that holds the light receiving portion which face each other so that the edge of the sheet passing through the sheet conveying path in the sheet width direction is enclosed, the moving holder being able to reciprocate in the sheet width direction, and
a holder drive portion which drives the moving holder in the sheet width direction; and an image forming portion which corrects an image forming position according to the edge position in the sheet width direction of the sheet detected by the position detection apparatus, and forms an image on the sheet, wherein the sensor unit has a plurality of pairs of sensors, each of which includes the light emitting portion disposed on the first holding surface and the light receiving portion disposed on the second holding surface as a pair and which are arranged along the sheet width direction, and the sensor unit detects the edge position of the sheet while the holder drive portion moves the moving holder in the sheet width direction and every other light emitting portions in the plurality of pairs of sensors is turned on.

10. The image forming apparatus according to claim 9, wherein
the plurality of pairs of sensors are disposed in the moving holder so that the pairs of sensors are respectively located on a plurality of reference positions corresponding to a plurality of types of sheets having different sizes in the width direction, and
the sensor unit detects the edge position of the sheet passing through while the holder drive portion reciprocates the moving holder in the sheet width direction by a predetermined amount set in advance.

11. The image forming apparatus according to claim 9, further comprising:
a detection portion which detects a type of the sheet passing through the sheet conveying path,
wherein a light emitting portion that is turned on among the plurality of light emitting portions is determined according to the type of the sheet detected by the detection portion.

12. The image forming apparatus according to claim 9, further comprising:
a reverse conveying path which re-conveys a sheet, which is turned upside down after an image is formed on the sheet by the image forming portion, to the image forming portion,
wherein the position detection apparatus is disposed on the reverse conveying path.

13. The image forming apparatus according to claim 9, wherein the light emitting portion includes an LED element.

14. An image forming apparatus comprising:
a position detection apparatus including
a sensor unit which includes a light emitting portion and a light receiving portion and detects an edge position in a sheet width direction of a sheet conveyed in a sheet conveying path,
a moving holder including a first holding surface that holds the light emitting portion and a second holding surface that holds the light receiving portion which face each other so that the edge of the sheet passing through the sheet conveying path in the sheet width direction is enclosed, the moving holder being able to reciprocate in the sheet width direction, and
a holder drive portion which drives the moving holder in the sheet width direction; and
an image forming portion which corrects an image forming position according to the edge position in the sheet width direction of the sheet detected by the position detection apparatus, and forms an image on the sheet,
wherein the sensor unit has a plurality of pairs of sensors, each of which includes the light emitting portion disposed on the first holding surface and the light receiving portion disposed on the second holding surface as a pair and which are arranged along the sheet width direction, and
a light emitting portion corresponding to the edge position in the sheet width direction of the detected type of the sheet is turned on and at least light emitting portions adjacent to the light emitting portion that is turned on are turned off.

15. The image forming apparatus according to claim 14, wherein
the plurality of pairs of sensors are disposed in the moving holder so that the pairs of sensors are respectively located on a plurality of reference positions corresponding to a plurality of types of sheets having different sizes in the width direction, and
the sensor unit detects the edge position of the sheet passing through while the holder drive portion reciprocates the moving holder in the sheet width direction by a predetermined amount set in advance.

16. The image forming apparatus according to claim 14, further comprising:
a detection portion which detects a type of the sheet passing through the sheet conveying path.

17. The image forming apparatus according to claim 14, further comprising:
a reverse conveying path which re-conveys a sheet, which is turned upside down after an image is formed on the sheet by the image forming portion, to the image forming portion,
wherein the position detection apparatus is disposed on the reverse conveying path.

18. The image forming apparatus according to claim 14, wherein the light emitting portion includes an LED element.

19. A position detection apparatus configured to detect an edge position of a sheet in a width direction orthogonal to a sheet conveying direction, comprising:
a plurality of light emitting portions,
a plurality of light receiving portions,
a holder configured to hold the plurality of light emitting portions and the plurality of light receiving portions,
a moving unit configured to move the holder in the width direction, and
a control unit configured to detect an edge position of the sheet in the width direction by moving the holder,
wherein the plurality of light emitting portions include a first light emitting portion configured to emit a light to a first region in the width direction and a second light emitting portion configured to emit a light to a second region which is different from the first region,
wherein a part of the first region and the second region overlap in the width direction, and
wherein the control unit is configured to detect an edge position of the sheet by moving the holder in the width direction with the first light emitting portion on and with the second light emitting portion off.

20. The position detection apparatus according to claim 19, wherein the control unit turns on the first light emitting portion and does not turn on the second light emitting portion in the case of detecting an edge position of a first sheet having a first length in the width direction when the first sheet is conveyed.

21. The position detection apparatus according to claim 20, wherein the control unit turns on the second light emitting portion and does not turn on the first light emitting portion in the case of detecting an edge position of a second sheet having a second length in the width direction when the second sheet is conveyed.

22. The position detection apparatus according to claim 19, wherein the control unit detects an edge position of a conveyed sheet responsive to a change from a state where a light receiving portion of the plurality of the light receiving portion is shielded from a light emitted by the first light emitting portion by the conveyed sheet to a state where the light receiving portion receives a light emitted by the first light emitting portion.

23. The position detection apparatus according to claim 19, wherein the holder includes a first part facing a first surface of a conveyed sheet and a second part facing a second surface of the conveyed sheet,
wherein the conveyed sheet passes through a space between the first part and the second part,
wherein the plurality of light emitting portions are provided on the first part, and
wherein the plurality of light receiving portions are provided on the second part.

24. The position detection apparatus according to claim 19, wherein the control unit detects an edge position of the a conveyed sheet by moving the holder in the width direction during the conveyed sheet passes through a space between the first part and the second part.

25. The position detection apparatus according to claim 19, wherein one of the plurality of light receiving portions is disposed on a region where the first region and the second region are overlapped.

26. The position detection apparatus according to claim 25, wherein the plurality of the light emitting portions include a third light emitting portion disposed adjacent to the second light emitting portion in the width direction and a fourth light emitting portion disposed adjacent to the third light emitting portion,
wherein the third light emitting portion is disposed at an opposite side with respect to the second light emitting portion and the fourth light emitting portion is disposed at an opposite side with respect to the third light emitting portion, and
wherein the control unit is capable of performing a first mode for detecting an edge position of a conveyed sheet in the width direction with the first light emitting portion and the third light emitting portion on and with the second light emitting portion and the fourth light emitting portion off, and a second mode for detecting an edge position of a conveyed sheet in the width direction with the second light emitting portion and the fourth light emitting portion on and with the first light emitting portion and the third light emitting portion off.

27. The position detection apparatus according to claim 19, wherein the second light emitting portion is disposed adjacent to the first light emitting portion in the width direction.

28. The position detection apparatus according to claim 19, wherein the plurality of light receiving portions are disposed at positions corresponding to a plurality of sizes of sheets.

29. The position detection apparatus according to claim 28, wherein the plurality of light emitting portions are disposed at positions corresponding to a plurality of sizes of sheets.

30. The position detection apparatus according to claim 19, wherein the control unit detects an edge position of the sheet in the width direction by reciprocating the holder in the width direction.

31. The position detection apparatus according to claim 19, wherein the plurality of light emitting portions include an LED element.

32. An image forming apparatus, comprising:
a plurality of light emitting portions,
a plurality of light receiving portions,
a holder configured to hold the plurality of light emitting portions and the plurality of light receiving portions,
a moving unit configured to move the holder in the width direction,
a control unit configured to detect an edge position of the sheet in the width direction by moving the holder, and
an image forming unit provided downstream of a position detection unit in a sheet conveying direction and configured to form an image on a sheet,
wherein the plurality of light emitting portions include a first light emitting portion configured to emit a light to a first region in the width direction and a second light emitting portion configured to emit a light to a second region which is different from the first region,
wherein a part of the first region and the second region overlap in the width direction,
wherein the control unit is configured to detect an edge position of the sheet by moving the holder in the width direction with the first light emitting portion on and with the second light emitting portion off, and
wherein the image forming unit changes a position of forming an image with respect to the sheet based on an detection result of the position detection unit.

33. A position detection apparatus configured to detect an edge position of a sheet in a width direction orthogonal to a sheet conveying direction, comprising:
a plurality of light emitting portions,
a plurality of light receiving portions,
a holder configured to hold the plurality of light emitting portions and the plurality of light receiving portions,
a moving unit configured to move the holder in the width direction, and
a control unit configured to detect the edge position of the sheet in the width direction by moving the holder,
wherein the plurality of light emitting portions include a first light emitting portion configured to emit a light to a first region in the width direction and a second light emitting portion configured to emit a light to a second region which is different from the first region,
wherein a part of the first region and the second region overlap in the width direction,
wherein the plurality of light receiving portions include a first light receiving portion which receives a light emitted by the first light emitting portion and a second light receiving portion which receives a light emitted by the second light emitting portion,
wherein the first light emitting portion is capable of having a first state in which the first emitting portion emits a light which can be received by the first light receiving portion and a second state in which the first light receiving portion cannot receive a light emitted by the first light emitting portion,
wherein the second light emitting portion is capable of having a third state in which the second light emitting portion emits a light which can be received by the second light receiving portion and a fourth state in which the second light receiving portion cannot receives a light emitted by the second light emitting portion, and
wherein the control unit is configured to detect an edge position of the sheet by moving the holder in the width direction with the first light emitting portion being in the first state and with the second light emitting portion being in the fourth state.

34. The position detection apparatus according to claim 33, wherein the first light emitting portion is not lit in the second state, and wherein the third light emitting portion is not lit in the fourth state.

35. A position detection apparatus configured to detect an edge position of a sheet in a width direction orthogonal to a sheet conveying direction, comprising:
 a plurality of light emitting portions,
 a plurality of light receiving portions,
 a holder configured to hold the plurality of light emitting portions and the plurality of light receiving portions,
 a moving unit configured to move the holder in the width direction, and
 a control unit configured to detect the edge position of the sheet in the width direction by moving the holder,
 wherein the plurality of light emitting portions include a first light emitting portion, a second light emitting portion disposed adjacent to the first light emitting portion in the width direction, a third light emitting portion disposed adjacent to the second light emitting portion in the width direction and a fourth emitting portion disposed adjacent to the third light emitting portion in the width direction,
 wherein the third light emitting portion is disposed at an opposite side with respect to the second light emitting portion and the fourth light emitting portion is disposed at an opposite side with respect to the third light emitting portion, and
 wherein the control unit is capable of performing a first mode for detecting an edge position of a conveyed sheet in the width direction with the first light emitting portion and the third light emitting portion on and with the second light emitting portion and the fourth light emitting portion off, and a second mode for detecting an edge position of a conveyed sheet in the width direction with the second light emitting portion and the fourth light emitting portion on and with the first light emitting portion and the third light emitting portion off.

36. The position detection apparatus according to claim 35, wherein the holder includes a first part facing a first surface of a conveyed sheet and a second part facing a second surface of the conveyed sheet,
 wherein the conveyed sheet passes through a space between the first part and the second part,
 wherein the plurality of light emitting portions are provided on the first part, and
 wherein the plurality of light receiving portions are provided on the second part.

37. The position detection apparatus according to claim 19, wherein the control unit gets information concerning a size of a conveyed sheet in the width direction and the control unit selectively lights the plurality of light emitting portions based on the information.

* * * * *